United States Patent
LaConte et al.

(10) Patent No.: US 6,834,520 B2
(45) Date of Patent: Dec. 28, 2004

(54) DEAD BOLT LOCK ASSEMBLY FOR FLIGHT DECK DOOR OF AN AIRCRAFT

(75) Inventors: Richard J. LaConte, Black Diamond, CA (US); Scott P. Kube, Everett, WA (US); Shannon J. Kupfer, Kirkland, WA (US); James J. Johnson, Snohomish, WA (US); Tony D. Autrey, Maple Valley, WA (US); David S. Melberg, Everett, WA (US); Larry C. Smith, Sumner, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/206,259

(22) Filed: Jul. 26, 2002

(65) Prior Publication Data

US 2003/0037578 A1 Feb. 27, 2003

Related U.S. Application Data

(60) Provisional application No. 60/370,890, filed on Apr. 8, 2002.

(51) Int. Cl.$^7$ .............................................. E05B 13/00
(52) U.S. Cl. ............................. 70/472; 70/134; 70/218; 70/223; 70/379 R
(58) Field of Search .................... 70/472, 422, 223, 70/134, 379 R, 379 H, 149, 218, 188, 189, 224; 292/DIG. 27

(56) References Cited

U.S. PATENT DOCUMENTS

| | | | | |
|---|---|---|---|---|
| 1,125,791 A | * | 1/1915 | Aston | |
| 1,190,439 A | * | 7/1916 | Marchfeld | |
| 1,714,286 A | * | 5/1929 | Waldo | |
| 1,814,302 A | * | 7/1931 | Falk | |
| 1,968,285 A | * | 7/1934 | Egan | |
| 2,176,297 A | * | 10/1939 | Dials | |
| 2,261,353 A | * | 11/1941 | Fedele | |
| 3,922,896 A | * | 12/1975 | Kagoura | 70/223 |
| 4,593,546 A | * | 6/1986 | Allen | 70/380 |
| 4,669,282 A | * | 6/1987 | Hoyt et al. | 70/129 |
| 4,679,418 A | * | 7/1987 | Allen | 70/380 |
| 4,895,404 A | * | 1/1990 | Toledano | 292/337 |
| 2002/0095964 A1 | * | 7/2002 | Davis | 70/278.3 |

FOREIGN PATENT DOCUMENTS

| | | | | |
|---|---|---|---|---|
| DK | 45063 | * | 12/1931 | 292/DIG. 27 |
| FR | 1275387 | * | 9/1961 | 70/493 |

* cited by examiner

Primary Examiner—Lloyd A. Gail
(74) Attorney, Agent, or Firm—Harness Dickey & Pierce P.L.C.

(57) ABSTRACT

A dead bolt lock apparatus specifically adapted for use with a flight deck door of an aircraft. The apparatus includes a dead bolt member which can be moved between locked and unlocked positions via a key. A lockout handle is included on the side of the apparatus which faces the flight deck area of the aircraft. The lockout handle is movable rotationally from a first position, wherein it has no affect on the use of the key to unlock the dead bolt, to a second position wherein it prevents the dead bolt from being moved out of a locked position by use of the key. The apparatus thus provides an additional degree of security to occupants of the flight deck by allowing them to prevent unlocking of the apparatus even with the key.

14 Claims, 3 Drawing Sheets

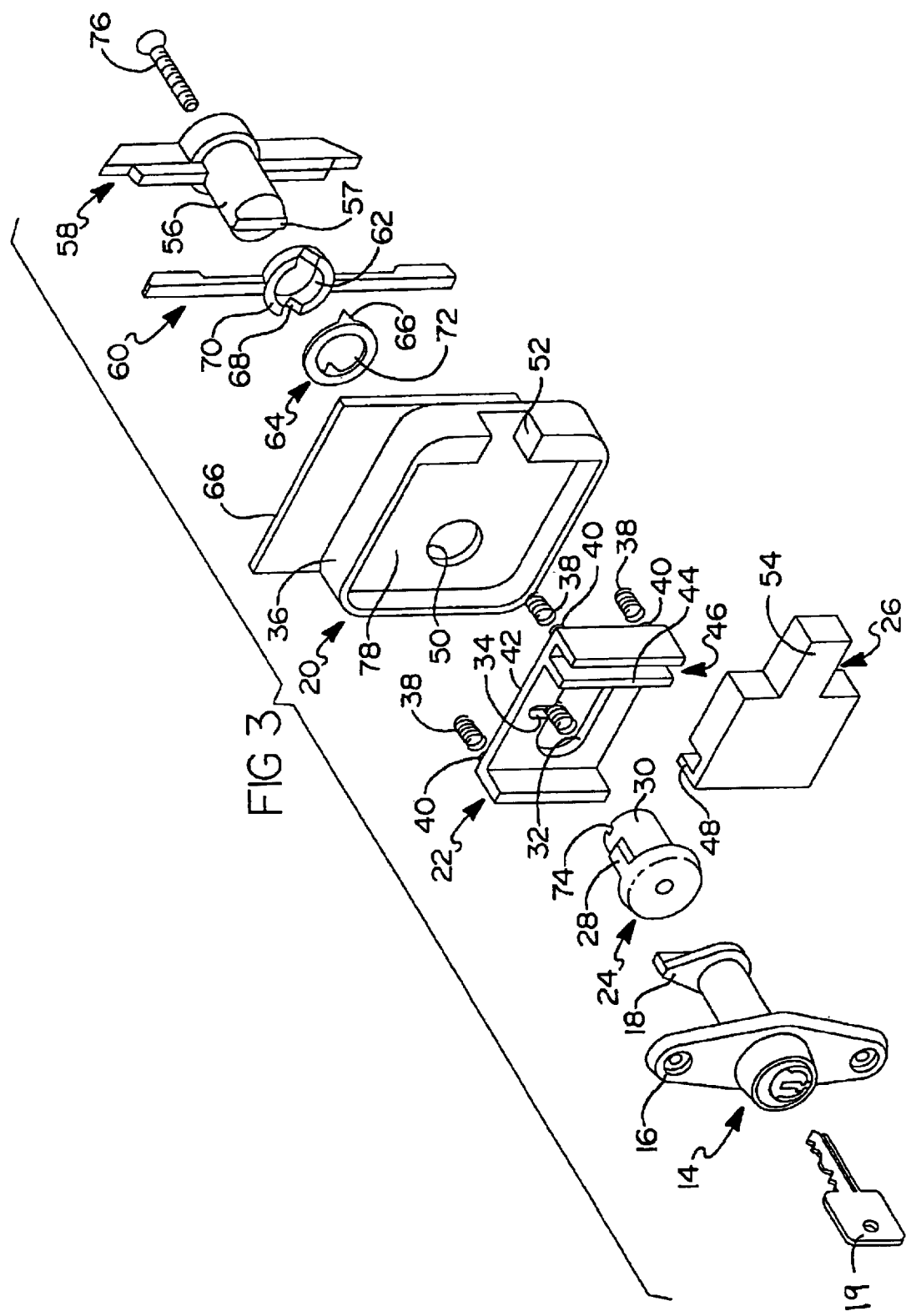

DEAD BOLT LOCK ASSEMBLY FOR FLIGHT DECK DOOR OF AN AIRCRAFT

CROSS-REFERENCE TO RELATED APPLICATIONS

This application claims priority from U.S. provisional application Ser. No. 60/370,890, filed Apr. 8, 2002.

FIELD OF THE INVENTION

This invention relates to lock assemblies, and more particularly to a dead bolt lock assembly particularly adapted for use with a flight deck door in an aircraft.

BACKGROUND OF THE INVENTION

Recent events have made increased security in the cockpit of a commercial airliner an important consideration. More specifically, these recent evens have led to new government requirements for lock assemblies used on flight deck doors in commercial aircraft which provide an even greater degree of security to occupants in the flight deck area of the aircraft.

Traditionally, locking systems used on flight deck doors have involved the use of a lock assembly which may be unlocked with a key by a flight attendant or other member of the flight crew. However, if the key is obtained by an individual who is not authorized to enter the flight deck area, then such an individual would be able to unlock the door lock assembly and gain unauthorized entry onto the flight deck of the aircraft.

Accordingly, the need has arisen for a door lock assembly particularly well adapted for use with a flight deck door in an aircraft which enables the door lock assembly to be locked and unlocked with a key, but which also provides members on the flight deck the means to override or "lock out" the assembly such that the assembly cannot be unlocked even with a key. In this manner, if members of the flight deck learn that an unauthorized individual on the aircraft may have obtained the key to the lock assembly, the lock assembly can be locked out from the flight deck side of the flight deck door, thereby preventing unlocking of the door lock assembly and unauthorized entry by an individual in the passenger cabin area. Such a door lock assembly would ensure that the occupants of the flight deck have the capability to prevent unlocking of the door lock assembly in the event of an in flight disturbance where it is deemed necessary to prevent any access whatsoever to the flight deck area by individuals in the passenger cabin area.

SUMMARY OF THE INVENTION

The above and other objects are provided by a door lock assembly in accordance with preferred embodiments of the present invention. The door lock assembly generally comprises a housing, a lock cylinder, a slide member, a dead bolt member and a lockout member. The lock cylinder is secured to the housing and includes a driver which is rotated when the proper key is inserted into the lock cylinder and rotated. The slide member is disposed such that it is able to engage a portion of the dead bolt and be moved laterally within the housing by the lock driver when the lock driver is rotated via the key. Thus, the key can be used to move the dead bolt member between a locked position, wherein it is engaged in a door jamb adjacent an edge of the flight deck door, or retracted into an unlocked position. The lockout handle is operatively secured to the slider member and is accessible from the flight deck side of the flight deck door by a crew member present in the flight deck area. In a first position, the lockout handle has no affect on operation of the dead bolt member via the key. Thus, when the lockout handle is in the first position, the dead bolt can be moved between its locked and unlocked positions simply by inserting the key into the lock cylinder and rotating the key between locked and unlocked positions. However, when the lockout handle is moved into a second position, the slider member is placed from the driver such that use of the key will not be able to unlock the dead bolt from its locked position. With the lockout handle in its lock out position (i.e., second position), the lock cylinder rotates but the driver does not make contact with the dead bolt member. Moving the lockout handle back into its first position displaces the slide member back into operative engagement with the lock driver, thus allowing the key to unlock the dead bolt member.

In one preferred form, the lock assembly of the present invention includes an escutcheon having a first camming surface. The lockout handle includes a second camming surface disposed in engagement with the first camming surface when the lock assembly is fully assembled. Movement of the lockout handle from the first position to the second position affects a camming action between the two camming surfaces which urges the lockout handle away from the door, thus displacing the slider out of operative engagement with the lock driver. In a preferred embodiment, a lock handle is also included and is operatively coupled to a handle driver member. When the dead bolt member is moved into its locked position by use of the key, the handle driver member is rotated, thus moving the lock handle simultaneously rotationally from a first position into a second position and thus indicating to individuals occupying the flight deck that the apparatus is in a locked position. In this preferred embodiment, the lock handle is disposed between the escutcheon and the lockout handle. Both of the handle members can be rotated when the lockout handle is also in its second position by a user grasping both handles with a single hand and rotating same.

The apparatus of the present invention thus provides a means for allowing members occupying the flight deck area of an aircraft to positively lockout the apparatus, thus preventing the apparatus from being unlocked in the event an unauthorized individual should gain access to the key. Advantageously, the apparatus allows an individual in the flight deck area to quickly and easily place the apparatus back into a condition wherein the key can be used to unlock the dead bolt. The apparatus provides an additional degree of security to the occupants of the flight deck by allowing them to place the apparatus in a condition wherein the apparatus cannot be unlocked even with the key.

Further areas of applicability of the present invention will become apparent from the detailed description provided hereinafter. It should be understood that the detailed description and specific examples, while indicating the preferred embodiment of the invention, are intended for purposes of illustration only and are not intended to limited the scope of the invention.

BRIEF DESCRIPTION OF THE DRAWINGS

The present invention will become more fully understood from the detailed description and the accompanying drawings, wherein:

FIG. 3 is an exploded perspective view of the major components of the apparatus.

DETAILED DESCRIPTION OF THE PREFERRED EMBODIMENTS

The following description of the preferred embodiment(s) is merely exemplary in nature and is in no way intended to limit the invention, its application, or uses.

Figure 1:
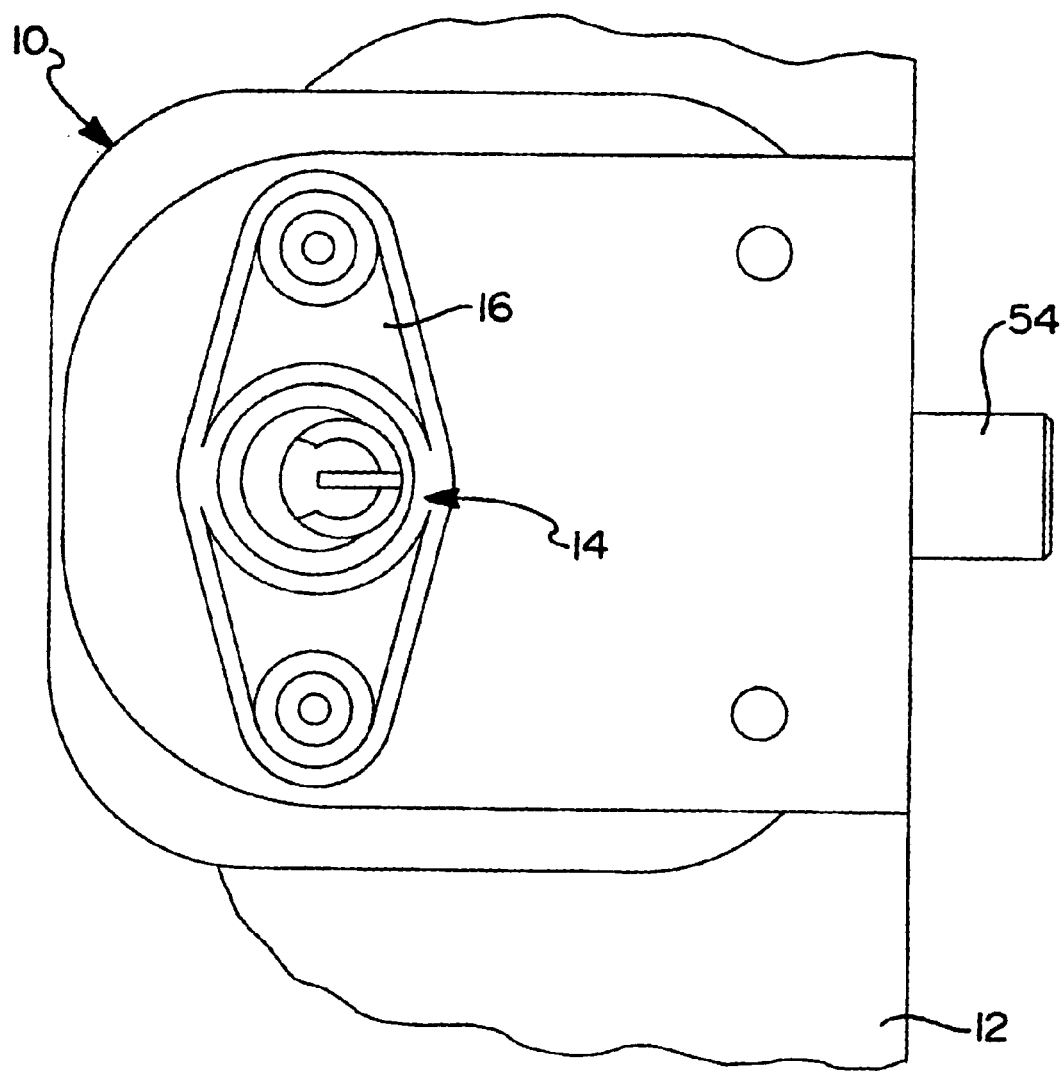
FIG. 1 is a view of the apparatus of the present invention from the passenger cabin side of a flight deck door.
Figure 2:
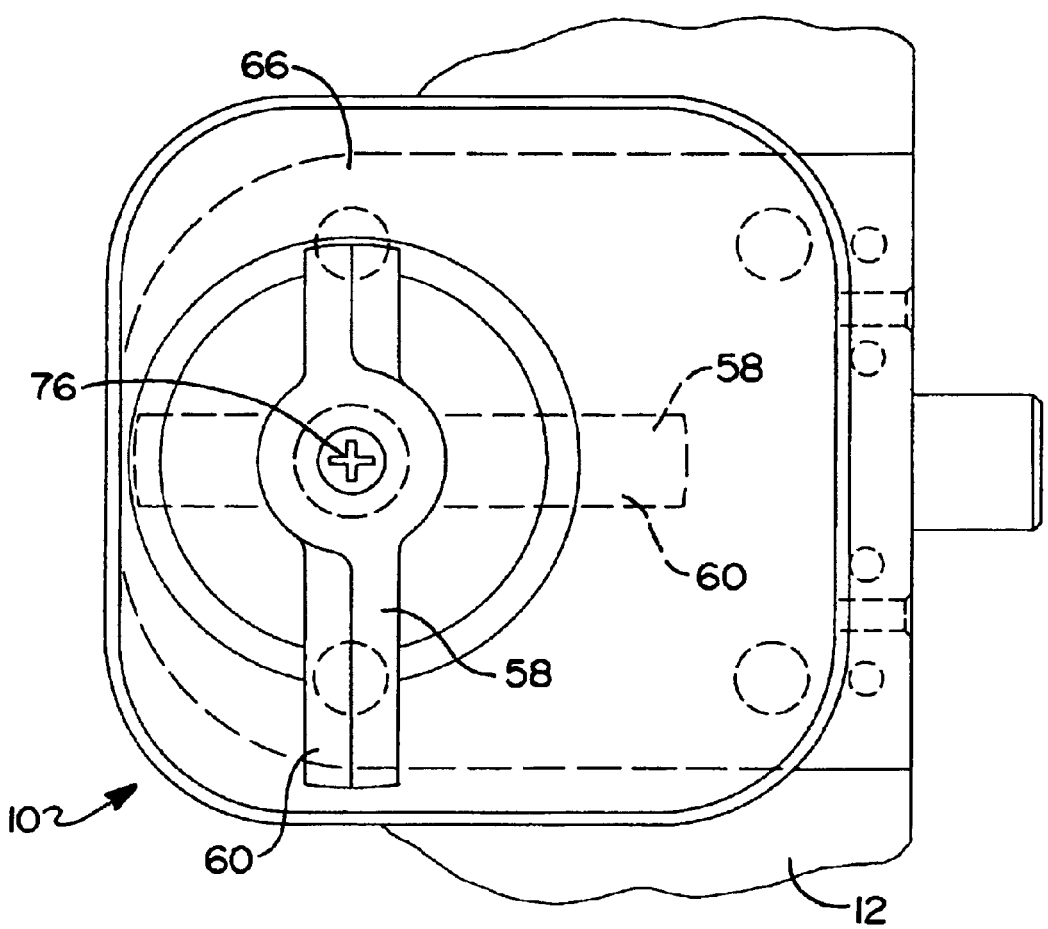
FIG. 2 is a view of the apparatus from the flight deck side of the door.

Referring to FIGS. 1 and 2, there is shown a dead bolt lock assembly 10 in accordance with a preferred embodiment of the present invention. The dead bolt lock assembly 10 is particularly well adapted for use on the flight deck door 12 of an aircraft.

With additional reference to FIG. 3, the apparatus 10 generally includes a lock cylinder 14 which is adapted to be secured to a passenger cabin side of the flight deck door 12. The lock cylinder 14 includes an escutcheon 16 and a driver 18 which is rotatable when a key 19 is inserted into the lock cylinder 14 and turned. The apparatus 10 further includes a housing 20 within which is disposed a slider member 22, a handle driver 24 and a bolt member 26. The handle driver 24 includes a key portion 28 projecting from a barrel portion 30 and projects through an opening 32 in the slide member 22. The key portion 28 fits within a notch 34 in the slide member 22 such that rotation of the handle driver 24 causes lateral movement of the slide member 22.

The housing 20 includes a peripheral wall 36 which houses the slide member 22. The slide member 22 is biased by a plurality of biasing elements 38, which in this embodiment comprise coil springs toward the bolt member 26 when the apparatus 10 is fully assembled. The biasing members 38 fit over corresponding posts 40 formed on a rear surface 42 of the slide member 22.

With further reference to FIG. 3, the slide member 22 further includes a pair of upstanding U-shaped wall portions 44 on a distal end which form a channel 46. The channel receives an end wall 48 of the bolt member 26 when the apparatus 10 is assembled. Thus, lateral movement of the slide member 22 causes corresponding lateral movement of the bolt member 26.

The housing 20 includes a central aperture 50 and a notched cutout 52. The notched cutout 52 receives a projecting dead bolt portion 54 of the bolt member 26. The central aperture 50 receives a neck 56 of a lock handle 58 therethrough when the apparatus 10 is assembled. A lockout handle 60 having an opening 62 is sandwiched between the lock handle 58 and a cam member 64. The cam member 64 sits flush and fixedly against an escutcheon 66 positioned on the flight deck side of the flight deck door 12. The cam member 64 has a cam surface 66 which fits within a notch 68 formed in a central portion 70 of the lockout handle 60. The notch 68 essentially forms a cooperating camming surface which causes the lockout handle 60 to be displaced linearly away from the escutcheon 66, and therefore away from the flight deck side of the door 12, when the lockout handle 60 is moved from the position shown in FIG. 3 to a substantially horizontal position. The neck portion 56 projects through opening 62 in the lockout handle 60, through an opening 72 in the cam member 64, and through the central aperture 50. The neck portion 56 has a rib 57 at an outermost end thereof which engages a notch 74 in the handle driver 24. Thus, rotational movement of the handle driver 24 causes a corresponding rotational movement of the lock handle 58. The lock handle 58 is secured via a threaded screw 76 to the handle driver 24.

Figure 4:
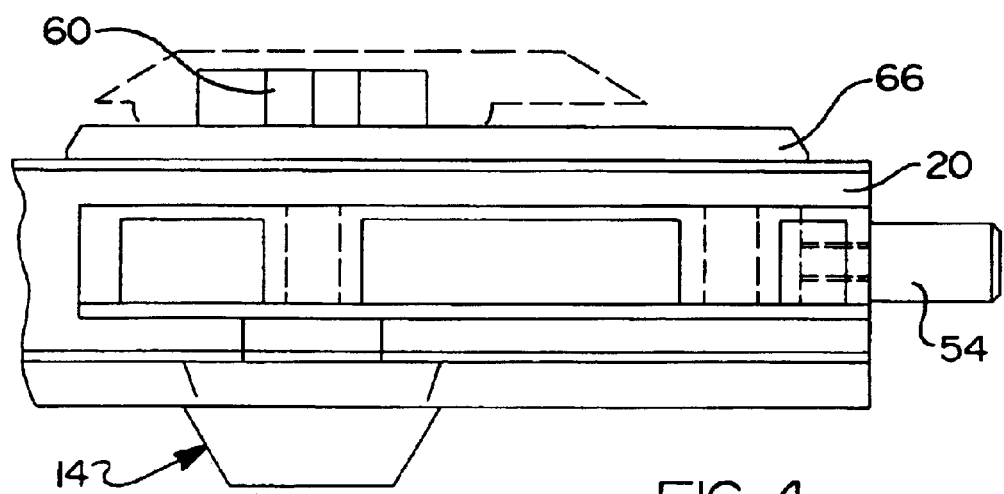
FIG. 4 is a top view of the apparatus showing how the lockout handle moves away from the flight deck side of the door when it is moved into a lockout position.

With reference to FIGS. 2, 3, and 4, the operation of the apparatus 10 will be described. Initially, when the key 19 is used to lock the apparatus 10, it is turned rotationally after being inserted into the lock cylinder 14. This causes the driver 18 to rotate, which in turn rotates the handle driver 24. This rotational movement of the handle driver 24 moves the slide member 22 laterally, which in turn moves the dead bolt member 26 laterally into a locked position relative to an adjacent door jamb of a wall of the aircraft. Once the key 19 is removed, the dead bolt member 26 prevents the door 12 from being opened. When the dead bolt 26 is moved into its locked position, the handle driver 24 also rotates the lock handle 58 rotationally into a horizontal position, thus providing an indication to individuals on the flight deck that the apparatus 10 is in the locked position. It will be appreciated that during the just-described locking action, the lockout handle 60 does not rotate but remains generally vertically positioned as shown in FIG. 2.

If a situation should develop in the passenger cabin area that causes members on the flight deck to determine that the door 12 should remain locked, then an individual on the flight deck can turn the lockout handle 60 to a generally horizontal position (shown in phantom in FIG. 2). This action causes the lockout handle 60 and the lock handle 58 to be cammingly urged by contact with the cam member 64 away from the flight deck side of the door 12. This movement is relatively small, and in one preferred form is approximately 0.125 inch or less in overall distance. However, this movement of the lock handle 58 away from the flight deck side of the door 12 causes the handle driver 28 to be drawn toward the escutcheon 66, which in turn urges the slide member 22 toward an inner wall 78 of the housing 20. This linear movement of the slide member 22 toward the inner wall 78 is sufficient to prevent the lock driver 18 from engaging the slide member 22 if the key 19 is used to move the lock driver 18 rotationally into its unlocked position. Thus, the lock driver 18 will not make contact with the slide member 14 when it is rotated. Therefore, even with the key 19 inserted in the lock cylinder 14, the apparatus 10 will not be able to be unlocked when the lockout handle 60 is rotated to its horizontal position, as indicated in phantom in FIG. 2.

The apparatus 10 thus provides a means for occupants of the flight deck to positively prevent unlocking of the apparatus 10 if it should be determined that a disturbance in the cabin area has arisen, or that a person in the passenger cabin area of the aircraft may have obtained the key 19 and may be seeking access to the flight deck area of the aircraft. The apparatus 10 allows an occupant of the flight deck to quickly and easily place the apparatus 10 in an unlocked condition by grasping both of the handles 60 and 58 and simultaneously rotating both handles into a generally vertical position as shown in FIG. 2. This causes the lock driver 18 to rotate into its unlocked position, thereby withdrawing the dead bolt portion 54 of the dead bolt member 26 out of the door jamb and allowing the flight deck door 12 to be opened.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A deadbolt lock apparatus particularly adapted for use with a flight deck door; said apparatus comprising:
   a housing adapted to be secured to said door;
   a lock cylinder disposed within the housing for accepting a key to allow said apparatus to be unlocked from a passenger side of said door, said lock cylinder including a driver movable rotatably when said key is inserted into said lock cylinder and rotated;
   a deadbolt member disposed within said housing and adapted to project into a door jamb positioned adjacent said door when said apparatus is in a locked position;
   a slider member operatively coupled to said deadbolt for urging said deadbolt member between an unlocked position and a locked position, said slider member further being operatively coupled to said driver such that rotational movement of said driver causes said slider to move said deadbolt member between said locked and unlocked positions;
   a lockout member disposed on a flight deck side of said door and operatively coupled to said slider such that movement of said lockout member from a first position to a second position causes said slider to be moved out of engagement with said driver, thereby preventing said driver from unlocking said deadbolt member when said key is inserted into said lock cylinder and turned to an unlock position; and
   wherein said lockout member comprises a camming surface, said camming surface operable to move said lockout member away from said door when said lockout member is moved into said second position.

2. The apparatus of claim 1, further including a lock handle operatively coupled to said slider and projecting adjacent said flight deck side of said door for allowing said apparatus to be unlocked from said flight deck side of said door.

3. The apparatus of claim 1, wherein said lockout member comprises a handle graspable by an individual, said handle operable with said camming surface to move said lockout member away from said door when said handle is moved into said second position.

4. The apparatus of claim 3, wherein said housing comprises an escutcheon having a protrusion adapted to engage with said camming surface, to thereby cause said lockout member to be urged away from said door when said handle is moved into said second position.

5. The apparatus of claim 4, wherein said protrusion is formed such that movement of said handle from said second position to said first position allows said lockout member to be displaced toward said door, thereby displacing said slider back into operative engagement with said driver.

6. The apparatus of claim 1, wherein said lockout member comprises a handle that is secured to said housing for rotational movement.

7. A deadbolt lock apparatus particularly adapted for use with a flight deck door, said apparatus comprising:
   a housing adapted to be secured to said door;
   a lock cylinder disposed within the housing for accepting a key to allow said apparatus to be unlocked from a passenger side of said door, said lock cylinder including a driver movable rotatably when said key is inserted into said lock cylinder and rotated;
   a deadbolt member disposed within said housing and adapted to project into a door jamb positioned adjacent said door when said apparatus is in a locked position;
   a slider member operatively coupled to said deadbolt for urging said deadbolt member between an unlocked position and a locked position, said slider member further being operatively coupled to said driver such that rotational movement of said driver causes said slider member to move said deadbolt member between said locked and unlocked positions;
   a lock handle operatively coupled to said slider member and projecting from a flight deck side of said door for enabling said apparatus to be unlocked from said flight deck side of said door;
   a lockout member disposed on a flight deck side of said door and operatively coupled to said slider member such that movement of said lockout member from a first position to a second position causes said slider member to be moved out of engagement with said driver, thereby preventing said driver from unlocking said deadbolt member when said key is inserted into said lock cylinder and turned to an unlock position;
   wherein movement of said lockout member from said second position to said first position places said slider member into operative engagement with said driver, to thereby permit said key to be used to unlock said apparatus; and
   wherein said housing comprises a first camming surface and said lockout member comprises a second camming surface, said camming surfaces cooperating to urge said lockout member linearly away from said door when said lockout member is moved into said second position.

8. The apparatus of claim 7, wherein said housing comprises:
   an escutcheon mounted on said flight deck side of said door;
   wherein said escutcheon comprises the first camming surface.

9. The apparatus of claim 7, wherein said lock handle and said lockout member are both mounted on said housing for rotational movement.

10. The apparatus of claim 9, wherein said lock handle and said lockout member are mounted adjacent one another such that both can be grasped with a single hand.

11. The apparatus of claim 7, wherein said slider member includes a U-shaped distal portion for engaging a slot formed in said deadbolt member when said lockout member is in said first position.

12. A deadbolt lock apparatus particularly adapted for use with a flight deck door, said apparatus comprising:
   a housing adapted to be secured to said door;
   a lock cylinder disposed within the housing for accepting a key to allow said apparatus to be unlocked from a passenger side of said door, said lock cylinder including a driver movable rotatably when said key is inserted into said lock cylinder and rotated;
   a deadbolt member disposed within said housing and adapted to project into a door jamb positioned adjacent said door when said apparatus is in a locked position;
   a slider member mounted within said housing for contact with said driver and said deadbolt member, to enable said driver to urge said slider member, and thereby said deadbolt member, between an unlocked position and a locked position when said key is inserted into said lock cylinder and rotated;
   a lock handle operatively coupled to said slider member and projecting from a flight deck side of said door for enabling said apparatus to be unlocked from said flight deck side of said door;

an escutcheon mounted on said flight deck side of said door and including a first camming surface;

a lockout handle pivotally mounted to said housing and disposed adjacent said escutcheon, said lockout handle including a second camming surface in contact with said first camming surface;

said lockout handle being operatively coupled to said slider such that rotational movement of said lockout handle from a first position to a second position causes said slider member to be displaced within said housing out of engagement with said driver, thereby preventing said driver from unlocking said deadbolt member when said key is inserted into said lock cylinder and turned to an unlock position; and wherein movement of said lockout handle from said second position to said first position places said slider member into operative engagement with said driver, to thereby permit said key to be used to unlock said apparatus.

13. The apparatus of claim 12, wherein said lock handle is pivotally coupled to said lockout handle.

14. The apparatus of claim 13, wherein said lock handle is arranged relative to said lockout handle such that both of said handles can be grasped simultaneously and rotated when said lockout handle is rotated from said second position back into said first position.

* * * * *